(12) United States Patent
Gorjiara et al.

(10) Patent No.: US 10,380,492 B2
(45) Date of Patent: Aug. 13, 2019

(54) ERROR DETECTION IN COMPUTER SYSTEMS GENERATING MULTI-DIMENSIONAL DATA

(71) Applicant: Microsoft Technology Licensing, LLC, Redmond, WA (US)

(72) Inventors: Bita Gorjiara, Sunnyvale, CA (US); Irina Belousova, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 15/583,489

(22) Filed: May 1, 2017

(65) Prior Publication Data
US 2018/0314577 A1 Nov. 1, 2018

(51) Int. Cl.
*G06F 11/00* (2006.01)
*G06N 7/00* (2006.01)
*G06F 11/36* (2006.01)
*G06N 20/00* (2019.01)

(52) U.S. Cl.
CPC ............ *G06N 7/005* (2013.01); *G06F 11/36* (2013.01); *G06N 20/00* (2019.01)

(58) Field of Classification Search
CPC .................................................. G06F 11/079
USPC ............................. 714/37, 38.1, 48, 49, 47.1
See application file for complete search history.

(56) References Cited

U.S. PATENT DOCUMENTS

| 9,563,916 B1* | 2/2017 | Torrez ................... G06Q 10/04 |
| 2015/0347480 A1* | 12/2015 | Smart ............... G06F 17/30327 |
| | | 707/743 |
| 2017/0032391 A1* | 2/2017 | Sharma .............. G06Q 30/0202 |

\* cited by examiner

*Primary Examiner* — Dieu Minh T Le
(74) *Attorney, Agent, or Firm* — Hickman Palermo Becker Bingham LLP; Daniel D. Ledesma (57) ABSTRACT

Techniques for detecting errors in a computing system are provided. In one technique, first member data that comprises first attribute values of a particular attribute is stored. Each attribute value in the first attribute values is associated with a different member of a first plurality of members. Second member data that comprises second attribute values of the particular attribute is stored. Each attribute value in the second attribute values is associated with a different member of a second plurality of members. For each attribute value of the first attribute values, a first number of instances of the attribute value in the first member data is determined, a second number of instances of the attribute value in the second member data is determined, and based on the first number and the second number, a determination of whether a notification indicating the particular attribute will be generated is made.

20 Claims, 4 Drawing Sheets

ERROR DETECTION IN COMPUTER SYSTEMS GENERATING MULTI-DIMENSIONAL DATA

TECHNICAL FIELD

The present disclosure relates to identifying potential errors in code and, more particularly, to analyzing changes to a set of data to determine whether the extent of the changes merits an analysis of the code. SUGGESTED CLASSIFICATION: 714/37; SUGGESTED ART UNIT: 2113.

BACKGROUND

Computer systems vary in complexity in terms of the number of machines in a computer system, the communication among the machines in the computer system, and the code that executes on each machine. The more complex a computer system, the more likely that errors will be introduced, such as faulty networking, faulty hardware, faulty configurations, or faulty firmware or software.

However, there are times when the introduction of an error does not immediately manifest itself. Days, weeks, or months may go by before an error is detected or even suspected. However, in the meantime, an entity that maintains, owns, or operates a computer system that is suffering from one or more errors may experience negative consequences, depending on the context in which the computer system operates. For example, if the computer system hosts a website, the website might experience fewer visits, fewer interactions (e.g., page views, comments, likes, clicks, scrolls) with each visit, shorter (in terms of time elapsed) interactions with each visit, fewer content items being displayed, fewer purchases, etc. If an error is not suspected, then fewer user activity may be attributed to other potential factors, such as changes in user interests/tastes or increased competition from other websites. Focus on such issues when the main issue is an error in software code or some other problem with the computing system could be very detrimental to the enterprise.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Data Validation

Data validation is useful in many different contexts and embodiments described herein are not limited to any particular context. One example context is validating targeting data, which is data that is used to determine what content should be delivered over a network to a user. For example, a content delivery service allows content providers to create content delivery campaigns, the purpose of which is to induce users to perform some action, whether offline or online, such as visit a web site, view a video, make a donation, apply for a job, or purchase a product. Each content delivery campaign includes targeting criteria (described in more detail herein) that must or may be satisfied before a content item associated with the campaign is delivered to a user. When a request associated with a user is received, the content delivery service may compare user data with the targeting criteria of one or more content delivery campaigns to determine which campaigns are relevant. If the user data is incorrect, then the chances of not identifying any content delivery campaign or the chances of identifying irrelevant content delivery campaigns increase, resulting in a poor user experience.

User related data, upon which user targeting data is based, can come from many sources, such as user profile data, online user activity data, analytics, etc. From time to time, user related data may become corrupted due to system issues or bugs in code. If the corrupted data is used to generate user targeting data, then significant downstream problems can result, such as a loss in revenue. Therefore, data validation is needed to avoid leveraging problematic user related data.

However, given the diversity of the user related data and the potential number of sources involved, data validation can be challenging. Additionally, it can be challenging to distinguish (1) normal changes in the user related data from (2) unexpected bugs. For example, member data may change naturally due to change of job, location, new education, etc. Thus, implementing data validation should avoid creating false alarms for natural data changes since false alarms might result in significant manual effort and time to investigate the false alarms.

Combining User Related Data

In one approach, for each user, user related data is combined into a single data stream, which contains multiple attributes, such as age, gender, spoken language, current employer, job title, location, companies followed, jobs applied for, current connections. Each attribute is associated with one or more values. For example, a person might have two employers at the same time.

Examples of data corruptions that could arise include:
- a certain attribute may not be populated for some members
- one or more values associated with a attribute may become corrupted. For example, instead of language value "English", a user's language value might become "{English}", which could happen due to bugs in one or more data providers.
- a single attribute might be removed for all members.

extra attributes or attribute values might be generated for members. For example, for an "employer" attribute, instead of listing just current employers, all past employers might be listed incorrectly.

As indicated previously, one of the main challenges of data validation is separating unusual changes from normal changes or "churn." Attributes that are based on online user behavior have naturally higher churn. For example, the number of companies that a user follows or the number of online groups that a user joins have higher churn than user attributes "gender" and "years of experience."

User Count Validation

One approach for data validation is to compare current user data with past user data to see what has changed for a single user. In this approach, for each attribute, the number of users whose corresponding attribute values have changed is tracked. If values of a particular attribute (e.g., job title) have changed for enough users compared to a previous time period (e.g., yesterday), then that particular attribute might be marked as problematic or "buggy."

The following table shows how this approach might work. For each attribute, a percentage of users whose attribute value matched with the last run is generated. For example, for 99.9% of users, their respective age values did not change since the last run. In other words, only 0.1% had a new age value, which might occur due to a birthday.

| Attribute Name | % users whose attribute values matches last known good | Attribute Failed Validation |
| --- | --- | --- |
| Age | 99.9% | No |
| Gender | 97% | Yes |
| Employer | 98% | No |
| Language | 99.9% | No |
| Degree | 80% | Yes |
| ... | ... | ... |

However, this approach can miss data corruptions because the affected number of users can be low for at least two reasons. First, a bug (or error in code) may affect only a few attribute values whose user/member count is below the threshold, but the corresponding revenue impact might be high. For example, all instances of the job title of "software engineer" have been removed. Any content delivery campaigns that target primarily "software engineers" will suffer from low content delivery. Second, a bug may affect a small percentage of users because the corresponding code is ramped up (or introduced into production) slowly.

Furthermore, it is not enough to just know which attributes might be problematic. Sometimes a human user should review which values are actually changed to determine if it is a natural change or a problematic one. Hence, an effective validation approach should provide actionable information. For example, given the table above, presume any matching rate below 98% is marked as failure. As a result, attributes Gender and Degree would fail the validation. However, it is not clear exactly why there is a problem. As a result, it is difficult to decide if the problem is a burst of natural change (e.g., students graduating in June) or the result of a real bug.

General Overview

Techniques are provided for detecting errors in a computer system, such as errors in software code. In one technique, data is tracked and validated based on changes in count distribution for multiple values of an attribute, instead of tracking changes for individual users. If the change of a count distribution of a value exceeds a particular threshold, then a notification that records the value may be generated and stored. In a related technique, different attributes are associated with different thresholds. A threshold may be established manually or may be determined based on historical analysis.

Process Overview

Figure 1:
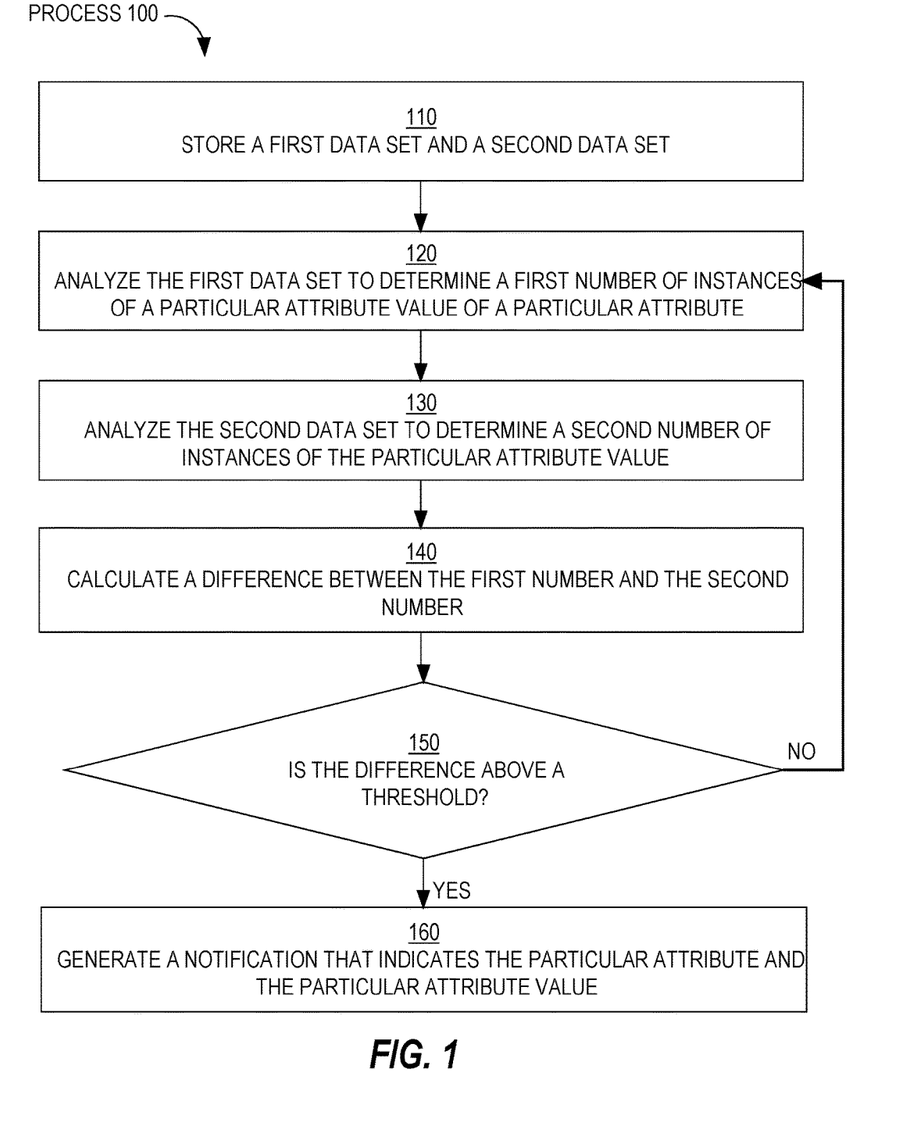
FIG. 1 is a flow diagram that depicts a process for validating data based on changes in count distribution for an attribute value, in an embodiment.

FIG. 1 is a flow diagram that depicts a process 100 for validating data based on changes in count distribution for an attribute value, in an embodiment.

At block 110, a first data set and a second data set are stored. The first data set represents a state of a particular data set at a first point in time or time range. The second data set presents represents a state of the particular data set at a second point in time or time range that is different relative to (e.g., subsequent to) the first point in time. Thus, the first data set and the second data set are considered different versions of the same data set.

For example, the first data set is a snapshot of a set of user profiles on Day 1 and the second data set is a snapshot of the set of user profiles on Day 2. The set of user profiles on Day 2 may correspond to the same set of users that correspond to the set of user profiles on Day 1. Alternatively, the set of user profiles on Day 2 may include one or more user profiles that correspond to users that do not correspond to any user profiles on Day 1. Similarly, the set of user profiles on Day 1 may include one or more user profiles that correspond to users that do not correspond to any user profiles on Day 2. Thus, some users may have registered with an online service on Day 2 and other users may have unregistered from the online service on Day 1.

At block 120, the first data set is analyzed to determine a first number of instances of a particular attribute value of a particular attribute.

At block 130, the second data set is analyzed to determine a second number of instances of the particular attribute value. For example, the particular attribute is an Age attribute in each user profile, the particular attribute value is 35, and the count for (or number of instances of) Age 35 is 267 in the first data set and 281 in the second data set.

Blocks 120-130 may involve determining a count for each value of multiple attribute values. For example, a count for each of ages 18-65 in each data set may be determined.

At block 140, a difference between the first number and the second number is calculated. If a count is determined for multiple attribute values, then multiple differences are calculated, one for each attribute value.

At block 150, it is determined whether the difference is above a threshold. If so, then process 100 proceeds to block 160. If a count is determined for multiple attribute values, then multiple differences may be compared to the threshold. Instead of considering the absolute difference between the two numbers, block 150 may involve calculating a percentage difference and comparing the percentage difference to a particular threshold.

At block 160, a notification is generated that indicates the particular attribute and, optionally, the particular attribute value. The notification may be part of a report that indicates multiple attribute values (of the particular attribute) whose changes were above a threshold.

The notification may be automatically sent to a computing device, such as a smartphone, a laptop computer, a desktop computer, or a tablet computer. For example, the notification may be transmitted over one or more computer networks using the IP protocol or an email protocol, or transmitted over a cellular network to a computing device. Alternatively, the notification may be displayed automatically when a user logs into a computer or computer system.

In an embodiment, blocks 120-150 are performed for each attribute of multiple attributes. For example, count distributions for different values of attributes Age, Employer, number of jobs applied to, and number of companies followed are determined and used to determine whether a change threshold is exceeded for some of the values. Different attributes may be associated with different thresholds, as described in more detail herein.

System Overview

Figure 2:
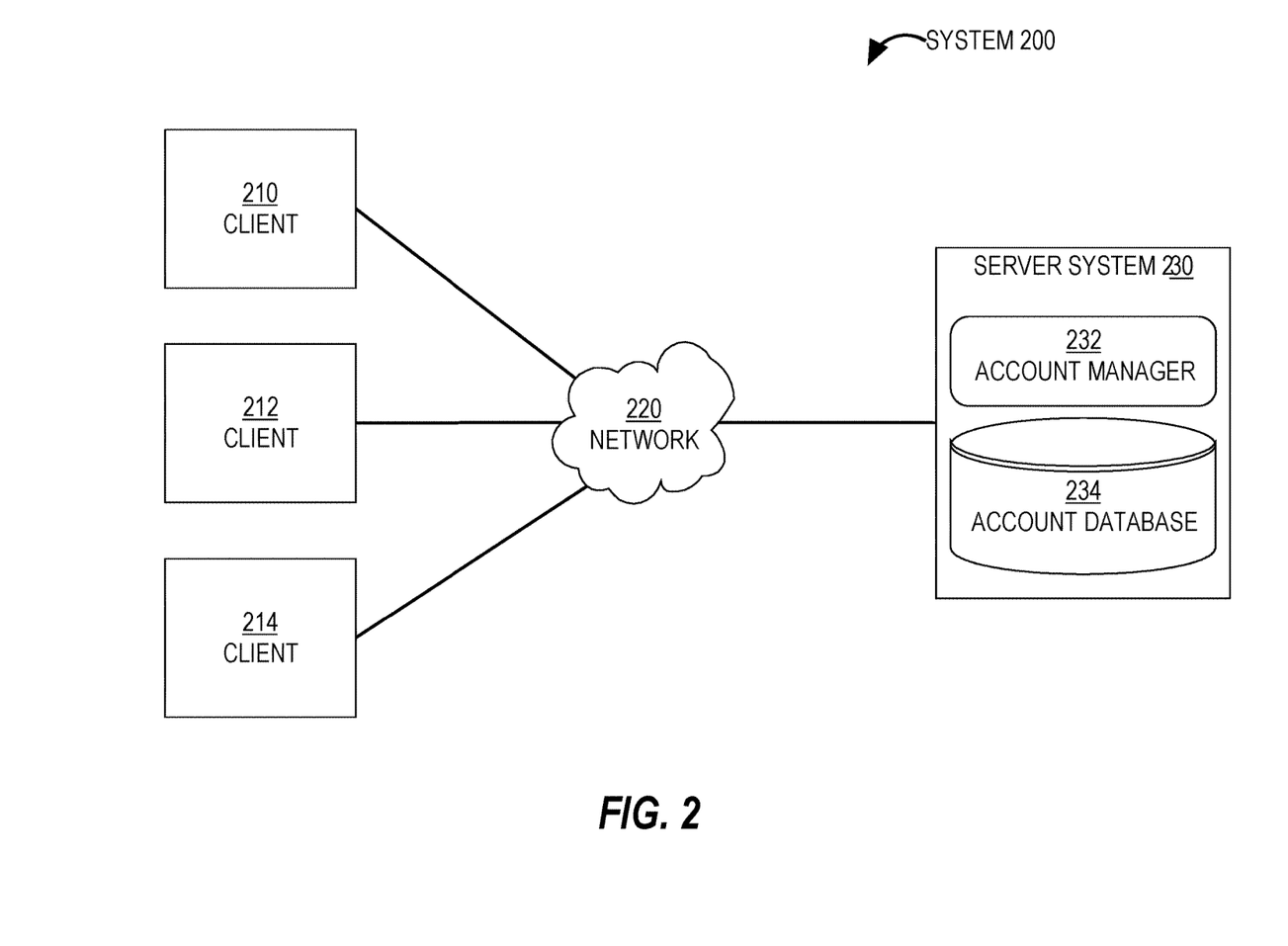
FIG. 2 is a block diagram that depicts an example system that collects and validates data, in an embodiment.

FIG. 2 is a block diagram that depicts an example system 200 that collects and validates data, in an embodiment. System 200 may also be used to implement other techniques described herein. System 200 includes client 210-214, network 220, server system 230, and storage 240.

Each of clients 210-214 is an application or computing device that is configured to communicate with server system 230 over network 220. Examples of computing devices include a laptop computer, a tablet computer, a smartphone, a desktop computer, a personal digital assistant (PDA), and a scanning device that is configured to generate electronic scan data based on information reflected on a physical medium, such as paper, a printed photo, or a business card. Thus, a computing device may include camera components that are capable of taking a picture (i.e., creating a digital image of a camera view). An example of an application includes a dedicated application that is installed and executed on a local computing device and that is configured to communicate with server 230 over network 220. Another example of an application is a web application that is downloaded from server system 230 and that executes within a web browser running on a computing device. Each of clients 210-214 may be implemented in hardware, software, or a combination of hardware and software.

Although only three clients 210-214 are depicted, system 200 may include many more clients that interact with server system 230 over network 220 and, optionally, other networks.

Through clients 210-214, users are able to upload information (e.g., text, images, graphics, video, audio) to server system 230. Later, users may employ clients 210-214 to interact with server 230 to retrieve, supplement, and/or update digital information (or simply "data").

Network 220 may be implemented on any medium or mechanism that provides for the exchange of data between clients 210-214 and server system 230. Examples of network 220 include, without limitation, a network such as a Local Area Network (LAN), Wide Area Network (WAN), Ethernet or the Internet, or one or more terrestrial, satellite or wireless links.

Server System

Although depicted as a single element, server system 230 may comprise multiple computing elements and devices, connected in a local network or distributed regionally or globally across many networks, such as the Internet. Thus, server system 230 may comprise multiple computing elements other than account manager 232 and account database 234. Account manager 232 receives account data from computing devices (e.g., clients 210-214) over network 220, where the account data is input by users (e.g., selecting characters on a physical or graphical keyboard) operating the computing devices. In response, account manager 232 creates and maintains accounts on behalf of users of clients 210-216. Additionally, account manager 232 may update accounts not only based on data provided by users through clients 210-214, but also by analysis of the data provided by the users and data that describes online activity of the users. For example, account manager 232 (or another component) may determine a geographic location of a user based on an IP address of a computing device that the user employs to interact with server system 230.

Account database 234 comprises information about multiples accounts. Account database 234 may be stored on one or more storage devices (persistent and/or volatile) that may reside within the same local network as server system 230 and/or in a network that is remote relative to server system. Thus, although depicted as being included in server system 230, each storage device may be either (a) part of server system 230 or (b) accessed by server system 230 over a local network, a wide area network, or the Internet.

In a social networking context, server system 230 is provided by a social network provider, such as LinkedIn, Facebook, or Google+. In this context, each account in account database 234 includes a user profile, each provided by a different user. A user's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages, articles, or other content that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

Server system 230 may prompt users to provide profile information in one of a number of ways. For example, server system 230 may have provided a web page with a text field for one or more of the above-referenced types of information. In response to receiving profile information from a user's device, server system 230 stores the information in an account that is associated with the user and that is associated with credential data that is used to authenticate the user to server system 230 when the user attempts to log into server system 230 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 230 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 230 (or another automatic process). For example, a user specifies, in his/her profile, a name of the user's employer. Server system 230 determines, based on the name, where the employer and/or user is located. If the employer has multiple offices, then a location of the user may be inferred based on an IP address associated with the user when the user registered with a social network service (e.g., provided by server system 230) and/or when the user last logged onto the social network service. As another example, a user operating client 110 may perform a user action relative to a digital entity represented by server system 230, such as establishing a connection with another user/member of server system 230, "following" a company or user online, posting an article online, providing a comment on an online article, "liking" another person's online article or comment, viewing an online job posting or job board, applying for a job through server system, etc.

While many examples herein are in the context of social networks, embodiments are not so limited. Another example context is server system 230 operating an online marketplace where users purchase various goods or services provided by one or more entities, whether business organizations or individual users. Such buyers and sellers may maintain account information at server system 230.

Calculating Churn

With a relatively large user base that is able to add, delete, and update data, server system 130 will process a significant number of changes. Also, different components of server system 130 may process a different set of these changes. The different components may be developed and/or managed by different teams, which means the quality of the data that server system 130 stores and processes may vary from one team to another. Thus, it can be difficult to determine whether changes in data (or "churn") is due primarily to user online behavior or to a problem with server system 130, such as poorly implemented code or a hardware or networking failure.

"Churn" indicates a level of changes that occur relative to one or more attribute values of a particular attribute, such as employer, age, or number of blog postings liked. In a first definition, churn may be a number of attribute values of a particular attribute that change a significant amount. Examples of a change to a particular attribute include the addition (or appearance) of a new attribute value (of the particular attribute) to a data set, the deletion (or removal) of an attribute value from a data set, or a "significant" change in the number of users who are associated with a particular attribute value of the particular attribute.

The following is an example of "churn." Attribute Age had values v1, v2, v3, and v4 in a particular data set on Day 1. On Day 2, it is determined that attribute Age has values v1, v2, v4, and v5. In this example, value v3 is no longer assigned to any member and a new value (v5) is assigned to (or associated with) one or more members. Since "churn" may be defined as a number of attribute values that are removed, added, or changed significantly, churn in this example is two. If the number of members associated with a value (e.g. v2) increases or decreases noticeably, then the churn count becomes three. If the member count of other values (e.g. v1 and v4) slightly change, but the change is below a certain threshold, then churn count remains at three.

In a second definition, instead of churn being the number of attribute values that change a significant amount, churn may be a total number of differences between two data sets of attribute values. In set notation where A is a data set at time 1 and B is a data set at time 2, a difference between the two data sets may be defined as B−A. In this scenario, additional instances of a value may be considered equal to the appearance of a new value (to data set B) and disappearance of a value. In a related example, a difference between two data sets that captures appearance of new values and disappearance of values is defined as (B−A) U (A−B), where U is the union of two sets.

The greater the churn of an attribute (first definition) or of instances of attribute values (second definition), the more likely that there is a problem with the attribute values and with the computer system that was used to generate or maintain the attribute values.

In an embodiment, different types of changes are weighted differently. For example, the appearance of a new attribute value and the removal (or disappearance) of all instances of a particular attribute value are weighted higher than changes in the number of instances of a particular attribute value. As another example, removal of all instances of a particular attribute value is weighted higher than the other types of changes (e.g., 1.5 times more) since such a scenario might result in fewer targets for content delivery campaigns that specifically target users that are associated with that particular attribute value (e.g., job title: CEO). As a related example, the disappearance of all instances of a particular attribute value might result in a notification being automatically created, even if there are no other types of changes.

The time range for calculating churn may vary from one implementation to another. For example, the time between two instances or versions of a data set that are compared may be one hour, six hours, one day, two days, one week, one month, or one year.

Significant Changes

As described herein, a "significant" change (other than a deletion of all instances of a value or an addition (or appearance) of a new value) is one type of change that may indicate an unusual change in the number of members associated with an attribute value or of an attribute overall. A "significant" change hard-coded or pre-defined or manually tunable. For example, a significant change may be 7% or more difference in the number of instances of a particular attribute value. As another example, a significant change may be defined a difference of 31 instances of a value in one time period (e.g., a day).

Alternatively, "significant change" may be determined based on an analysis of historical data. For example, temporal information (e.g., a date and/or time) of when software bugs associated with a particular attribute were detected is compared to significant change values during the date/time indicated by the temporal information. If, for example, a bug was detected with respect to an attribute on Day 5 and a corresponding significant change of a value of that attribute was 18% on Day 4, then a significant change value for that attribute may be set to 18% or another value that is based on 18% (e.g., 10% lower than the percent churn for the time period in question.) As another example, daily significant change values of one or more attribute values of an attribute are calculated for the past six months and a certain percentile (e.g., 95%) of all the calculated significant change values is selected as the significant change value or threshold for that attribute. Determining a significant change value or threshold based on an analysis of historical data may be performed manually or automatically by, for example, a software program.

As another example, a statistical distribution model is applied to determine a threshold for what is considered a significant change to an attribute value. For example, a significant change is modeled using Gaussian distribution $N(\mu, \sigma 2)$ with parameters mean $\mu$ and variance $\sigma^2$. To calculate Gaussian distribution parameters mean and variance, historical change values are used and a significant change threshold is established based on confidence intervals. For example, if a change value for a specific attribute exceeds $\mu \pm 1.96 * \sigma^2$ threshold, then the corresponding change is considered significant and a notification is generated indicating that there might be an anomaly in the underlying data.

As another example, one or more machine learning approaches may be implemented, such as a classifier that is trained based on a data set of known "bad" changes and/or a set of known "good" changes. A change (whether "good" or "bad") may be defined as an absolute change (e.g., a count of 53 to a count of 74 is a change of 21) or as a percentage change (e.g., a count of 53 to a count of 74 is a change of +39.6%). A "good" change is a change with a label of "good" and a "bad" change is a change with a label of "bad." For example, a team of validators may investigate an attribute when a possible issue arises. If the team determines that there is no bug associated with the attribute, then the change value at the time of the investigation is recorded with a label of "good." If the team determines that there is a bug associated with the attribute, then the change value at the time of the investigation is recorded with a label of "bad." Based on the training data, a classifier is generated and then validated against another set of known good and/or known bad changes. Once validated, the classifier is used to determine a change value (e.g., 5% or 34) that is considered a "significant" change.

If multiple attribute values are considered, then a different classifier may be generated and used for each attribute. Therefore, different attributes may be associated with different thresholds at which an amount of changes is considered "significant."

Cardinality and Churn Thresholds

"Cardinality" is the number of attribute values that a particular attribute has. For example, if attribute Age has only values v1, v2, v3, and v4, then the cardinality of attribute Age is four.

"Percent churn" is "churn" divided by cardinality (multiplied by 100). Given the example above, if only values v2 and v3 experienced a significant change, then percent churn is $2/4*(100)=50\%$.

"Percent churn threshold" is the maximum allowed percent churn for a single attribute. If the percent churn of an attribute is below a particular percent churn threshold for the attribute, then validation has passed for that attribute. Otherwise, validation has failed for that attribute and a notification or alert is generated.

In an embodiment, a percent churn threshold for an attribute is determined based on an analysis of historical data. For example, temporal information (e.g., a date and/or time) of when software bugs associated with a particular attribute were detected is compared to calculated percent churn values during the date/time indicated by the temporal information. If, for example, a bug was detected with respect to an attribute on Day 5 and a corresponding percent churn of the attribute was 12% on Day 5, then a percent churn threshold for that attribute may be set to 12% or another value that is based on 12% (e.g., 10% lower than the percent churn for the time period in question.) As another example, daily percent churn values of a particular attribute are calculated for the past six months and a certain percentile (e.g., 95%) of all the calculated percent churn values is selected as the percent churn threshold for that particular attribute. Determining a percent churn threshold based on an analysis of historical data may be performed manually or automatically by, for example, a software program.

As another example, a statistical distribution model is applied to detect anomalies in the data. For example, a percent churn value is modeled using Gaussian distribution $N(\mu, \sigma 2)$ with parameters mean $\mu$ and variance $\sigma^2$. To calculate Gaussian distribution parameters mean and variance, historical percent churn values are used and a percent churn threshold is established based on confidence intervals. For example, if a percent churn value for a specific attribute exceeds $\mu \pm 1.96 * \sigma^2$ threshold, then an alert is generated since there might be an anomaly in the underlying data.

As another example, a machine learning technique, such as the classifier approach described above that is used to determine a "significant" change, may be used to calculate a percent churn threshold. For example, a classifier that is trained based on a data set of known "bad" scenarios and/or a set of known "good" scenario. A "good" scenario is a scenario with a label of "good" and a "bad" scenario is a scenario with a label of "bad." For example, a team of validators may investigate an attribute when a possible issue arises. If the team determines that there is no bug (or other negative computer system issue) associated with the attribute, then the percent churn at the time of the investigation is recorded with a label of "good." If the team determines that there is a bug associated with the attribute, then the percent churn at the time of the investigation is recorded with a label of "bad." Based on the training data, a classifier is generated and then validated against another set of known good and/or known bad scenarios. Once validated, the classifier is used to determine a percent churn threshold (e.g., 8%) for an attribute, where future validations that result in a percent churn above that threshold results in a notification being generated.

In an embodiment, multiple thresholds are associated with a single attribute. Each threshold is associated with a different alert level. For example, if the percent threshold of an attribute exceeds only a first (e.g., lowest) threshold but not a second (higher) threshold, then a notification is stored and is only presented when a user/administrator logs into a computing device and requests a dashboard to be updated to indicate any notifications. If the percent threshold exceeds the second threshold but not a third (e.g., highest) threshold, then a notification is sent to a particular user (e.g., a team lead). If the percent threshold exceeds the third threshold, then a notification is sent to all members of a team in order to address the issue.

In an embodiment, a different threshold is associated with each type of change for a single attribute. Thus, a percent churn threshold is determined for different types of changes and a percent churn is calculated for the different types of changes. For example, for attribute Age, a first percent churn is calculated for additions of new values, a second percent churn is calculated for deletions of all instances of one or more values, and a third percent churn is calculated for "significant" changes that do not involve additions or deletions. Different types of changes may be associated with different percent churn thresholds.

An advantage of considering the cardinality of attribute values of an attribute includes prevention of false alarms. High cardinality attributes tend to have higher churn relative to lower cardinality attributes. If cardinality is not incorporated into the determination of whether changes in a data set are a result of a software bug, then the probability of false alarms increase.

Per-Attribute Percent Churn Threshold

In an embodiment, each attribute of multiple attributes is associated with a different percent churn threshold. Some attributes are expected to have higher churn percent than others. For example, a percent churn threshold for attribute Language in user profiles is 1%, a percent churn threshold for attribute Current Employer in user profiles is 5%, a percent churn threshold for attribute Number of Companies a User Follows in user profiles is 8%.

In an embodiment, each attribute of multiple attributes is assigned a churn classification and each churn classification is associated with a different churn threshold. For example, an attribute is considered either a high churn attribute or a low churn attribute. In this example, the percent churn threshold is (1) 0.02% for low churn attributes and (2) 10% for higher churn attributes. The thresholds may be manually tuned (i.e., set by a user or developer) or may be "learned" using approaches herein, such as a classifier approach or a Gaussian (or "normal") distribution approach.

An advantage of calculating churn on a per-attribute basis and making decisions based on percent churn includes decreasing the rate of false alarms and significant improvement in the accuracy of finding real issues in the underlying data.

Temporal-Based Percent Churn Threshold

In an embodiment, an attribute is associated with multiple temporal-based percent churn thresholds. For example, at the beginning on the calendar year, many users may update their respective profiles or might be more active online looking for new employment opportunities. As a result, certain attributes may be updated more frequently at that time of the year, such as Age, Skills, and Companies Followed. If a percent churn threshold is the same throughout the year, then the natural changes at the beginning of year may result in multiple false positives, or notifications about potential problems with a certain attribute/attribute value when there is no problem. In this example, the percent churn threshold for an attribute may be different (e.g., higher) at the beginning of the year then the remainder of the year.

As another example, more activity may occur during certain holidays or other times of the year, such as a graduation, when graduates tend to update their profiles more frequently and/or are more active online.

A temporal-based percent churn threshold may be associated with a certain time or time range within a day. For example, online activity of users may occur primarily between the hours of 5 pm and 8 pm. Thus, if different versions of a data set are compared on an hourly (or couple hour) basis, then some attributes should have percent churn thresholds that are different (e.g., higher) than the percent churn thresholds used during the remainder of the day.

Churn Report

In an embodiment, a report is generated that indicates which values changed significantly and, optionally, how much those values changed. For example, if value v1 appears in a first version of a data set and not a second version of the data set, then the report may: (1) identify v1; (2) indicate that v1 is not found in the second version of the data set; and (3) indicate a number of times v1 appears in the first version of the data set. As another example, if value v2 appears in the second version of the data set and not the first version of the data set, then the report may: (1) identify v2; (2) indicate that v2 is not found in the first version of the data set; and (3) indicate a number of times v2 appears in the second version of the data set. As another example, if value v3 appears in the first version of the data set a first number of times and appears in the second version of the data set a second number of times and a difference (or percentage difference) between the first number and the second number is greater than a particular threshold, then the report may: (1) identify v3; (2) indicate that v3 is a significant change or that v3 is neither new nor was it deleted; and (3) indicate the first number and the second number and/or a percentage difference between the first number and the second number.

In an embodiment, a churn report may identify multiple different attribute values for a particular attribute, a different type of change for each attribute value that changed significantly, and/or the actual counts. For example, a churn report may: (1) identify values v1, v2, and v3; (2) indicate that v1 was a deprecation (or removal), v2 was an addition, and v3 was a change in non-zero counts (e.g., 98 to 57); and (3) that value v1 went from 1018 to 0, that value v2 went from 0 to 72, and that value v3 when from 98 to 57 or that value v3 experienced a 442% reduction in count.

Each type of change may be displayed differently in a churn report, for example, through different text, font size, font color, font type, font style, images, and/or graphics. For example, attribute values that were new in a subsequent version of a data set may be red, attribute values that were deleted or removed may be blue, and attribute values that otherwise changed significantly may be green.

In an embodiment, a churn report identifies multiple attributes and, for each attribute, a percent churn. The churn report may be limited to showing just attributes where the respective percent churn thresholds were exceeded along with the actual values that changed significantly. Alternatively, the churn report may show multiple attributes where some of the percent churn thresholds were not exceeded.

In a related embodiment, a churn report includes one or more graphical elements (e.g., buttons, tabs) that, when selected by a user, causes different sets of attributes to be displayed, along with percent churn values and/or actual values that changed significantly. For example, one or more graphical elements may allow a user to view causes attributes on a per-data source basis. For example, selection of one graphical element causes churn data regarding a first set of attributes from a first data source to be displayed while selection of another graphical element cases churn data regarding a second set of attributes from a second data source to be displayed. The different set of attributes may have one or more attributes in common.

As another example, a graphical element, when selected, causes only attributes whose percent churn thresholds were exceeded to be displayed while selection of the same (or different) graphical element causes one or more other attributes whose percent churn thresholds were not exceeded to be displayed.

An advantage of such reports is the ability to simplify failure reviews (conducted by people) because a churn report directly identifies the values that are the result of the system failure. Therefore, failure reviews can be efficient and fast.

The following is an example failure report that comprises two tables:

| Name | Churn | Cardinality | Churn percent | Churn threshold |
|---|---|---|---|---|
| functions | 19 | 26 | 73% | 0.2% |
| titles | 1346 | 23907 | 5.6% | 0.2% |

| Title Values | Change type | Member diff % | Current member count | Past member count |
|---|---|---|---|---|
| 21956 | changed | −99 | 926 | 590423 |
| 21941 | changed | −99 | 392 | 1053722 |
| 21688 | deprecated | −100 | 0 | 92623 |
| ... | ... | ... | ... | ... |

The first table shows a summary of which attributes failed and indicates the churn threshold for each failed attribute. The second table provides more detailed information for each failed attribute indicated in the first table. For example, the second table indicates the values of attribute Job Title (which may be a numeric version of an actual job title), the type of change (e.g., deprecated, changed, or addition), the current count of members who have the particular attribute value, the past count of members who had the particular attribute value, and a percentage member difference (which is based on the difference between (1) the current count and the past count).

Multiple Data Sources

In an embodiment, a data validator receives data sets from multiple data sources. The multiple data sources may be provided by the same entity or by different entities, which may be remote relative to each other.

Figure 3:
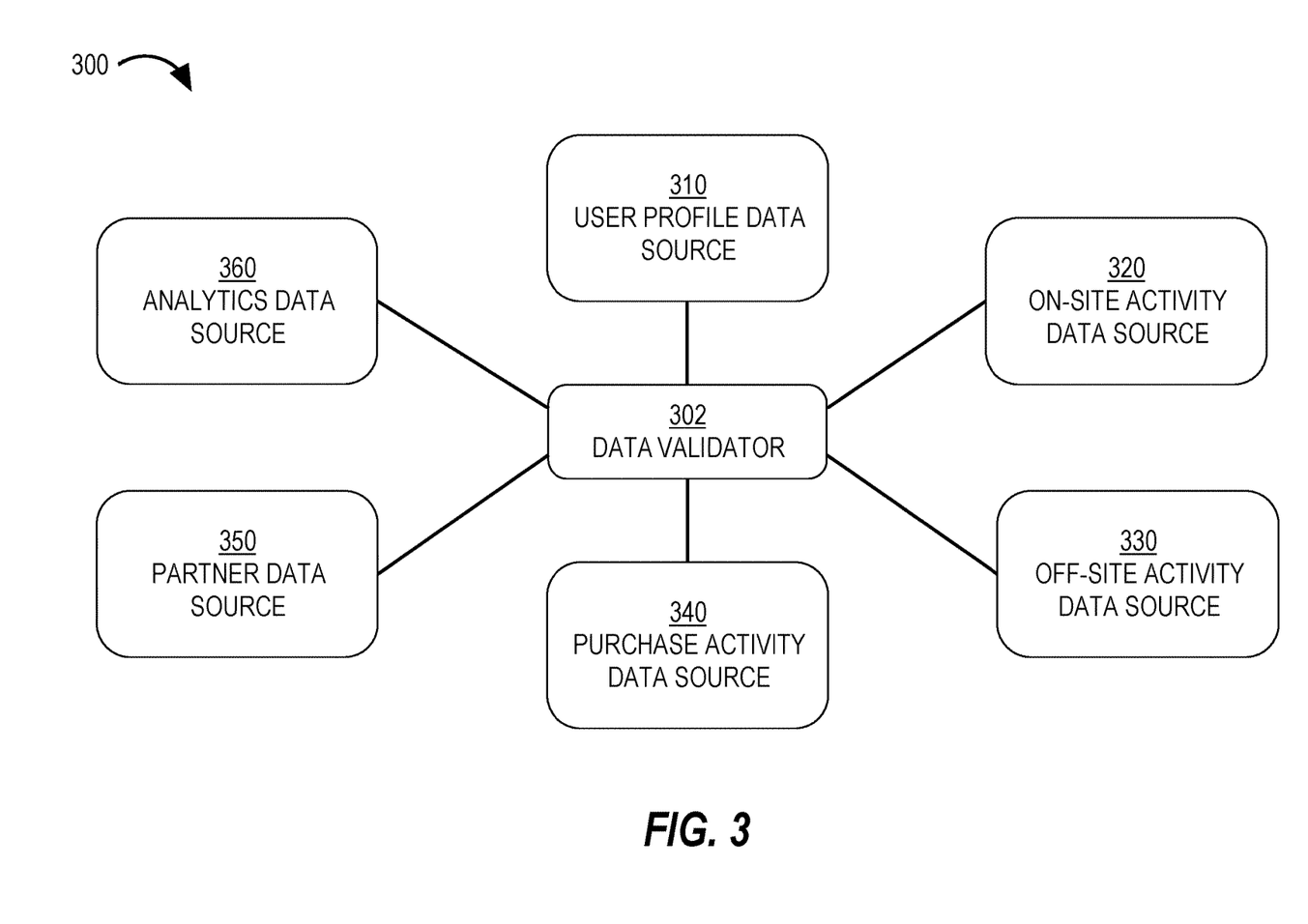
FIG. 3 is a block diagram depicting a system that collects and validates data from multiple data sources, in an embodiment.

FIG. 3 is a block diagram depicting a system 300 that collects and validates data from multiple data sources, in an embodiment. System 300 may include server system 230. System 300 includes a data validator 302, a user profile data source 310, an on-site activity data source 320, an off-site activity data source 330, a purchased data source 340, a partner data source 350, and an analytics data source 360. While only one data source is depicted for each type, each type may be associated with multiple data sources. For example, system 300 may include multiple partner data sources, multiple on-site activity data sources, and multiple analytics data sources, each of which may be managed and maintained by a different team of developers.

Each data source may comprise one or more computing devices and one or more storage media for storing certain types of data pertaining to the data source. User profile data source 310 stores profile data regarding multiple users or members, such as members of a social network. As described herein, at least some of the profile data is provided by users of computing devices that interact with server system 230.

On-site activity data source 320 stores data about activity that users performed relative to a website that may be owned or maintained by the entity that performs the data validation. On-site activity of a user may include how often and when the user requests data from the website, may indicate the different pages or content views presented to the user through the website, and may include how often the user commented on an online data item (e.g., an article, blog posting, an image, a video), liked online data items, posted online data items, viewed certain advertisements, viewed video items, and applied for online job openings.

Off-site activity data source 330 stores data about activity that users performed online at locations different than a particular website (e.g., hosted by server system 230). The type of activity may be similar to activity that the users perform "on-site", but might not be as extensive as the on-site activity. For example, off-site activity may include information about which users selected which content items (e.g., advertisements) presented through third-party publishers, but might not include any the actual content of content items (e.g., post or comment) with which users interacted. The off-site activity may be related to user activity relative to content items that server system 230 provides (directly or indirectly) to the third-party publishers.

Each activity may be associated with multiple data items, such as a name of the user that performed or initiated the activity, a unique identifier of the user, a date and/or time of day, a type identifier that identifies the type of activity, and a unique identifier of the object of the activity (e.g., a particular webpage, a particular content item, a particular blog posting).

Purchased data source 340 stores data that has been purchased from another entity (e.g., an entity different than an entity that owns or operates system 300). An example of purchased data is salary data from an external source. For example, the external source may store or maintain salary data that is based on job title and name of company. With that purchased information, system 300 (or another system or component) predicts the salary of people with a similar profile (e.g., similar job title and/or similar name of company)

A partner data source 350 is unlike purchased data source 340 in that the data comes from an internal source as opposed to an external source. Partner data source 350 stores data about users who interact with other components or affiliates of the entity that owns or operates server system 230 or data validator 302. Each (internal) partner may generate and store a record for each user or each activity that is performed by a user relative to a resource associated with the partner. For example, a partner may be an online learning platform that users may subscribe to in order to sign up for online courses pertaining to different subjects, such as Geometry, History, Web Publishing, Personal Finance Management, etc. In this example, the data may indicate when a user registered with the partner, how often the user visits a website of the partner, which courses the user has registered for, which courses the user has completed, which courses the user has started, but not completed, which certificates or degrees the user has earned through the partner.

An analytics data source 360 stores data that represents an analysis of data provided by one or more other data sources. For example, a component associated with analytic data source 360 may access user profile data source 310, on-site activity data source 320, and off-site activity data source 330 and, based on an analysis of data found at those three data sources, predict one or more languages that are familiar to a user, where that user might live, and/or whether that user may be looking for a new job.

A common attribute across all these data sources may be unique user identifiers. Unique user identifiers allows data from multiple data sources to be combined into a single data object or record for each user. Data validator 302 may be responsible for recognizing common user identifiers and combining (or associating) data sets associated with the same user identifier.

Data Validator

Data validator 302 is implemented in software, hardware, or any combination of software and hardware. In an embodiment, one or more data sources automatically transmit their respective data sets to data validator 302. Additionally or alternatively, data validator 302 transmits a request to one or more data sources, each of which responds by transmitting one or more data sets to data validator 302.

In either scenario, a data source transmits multiple instances of a data set, such as two instances of a data set, which data validator 302 may validate by comparing the two instances with each other. Additionally or alternatively, a data source transmits a single instance of a data set to data validator 302 and data validator 302 identifies a previous instance of the data set and then performs a validation operation by comparing the two instances of the data set.

Multiple data sources provide a different set or type of data. For example, one data source may be generated and updated by a user profile application, another data source may be generated and updated by a company following application, another data source may be generated and updated by a job tracking application, and another data source may be generated and updated by a language translation application.

In an embodiment, the format of the data received from the multiple data sources may vary from one data source to another. Thus, data validator 302 (or another system component) may modify a data set from a data source prior to performing a validation operation on the data set. Each data source may be associated with a different adaptor that adapts or formats the received data into a common format that data validator 302 recognizes.

In an embodiment, an instance of a data set from a data source may indicate or uniquely identify the data source. Additionally or alternatively, data validator 302 labels an instance of a data set with a data source identifier that uniquely identifies the data source from which the instance of the data set originated. Data validator 302 may determine the originator of an instance of a data set in one of multiple ways, such as analyzing the format of the received data set, determining through which port the data set was received, or a message that accompanies (or immediately preceded) the data set.

In an embodiment, data validator 302 performs a separate validation operation on each data set from each data source. If a data set fails a validation test, then a report identifying the data source may be generated.

Additionally or alternatively, data sets from different data sources are combined to generate a combined data set, which data validator 302 validates. If a combined data set fails a validation test, then a report is generated (e.g., by data validator 302 or another component of system 300) that identifies the attribute, the attribute values that changed significantly, and/or one or more data sources that might be responsible for the "bad" portion of the combined data set. If only a strict subset of the multiple data sources could have been the source of the attribute or attribute values that changed significantly, then the data source(s) may be identified based on a mapping between attributes and data sources.

An advantage of at least some approaches described herein is that the approaches scale well for a relatively high number of data sources. One reason for the ability to scale well is due to the reduction in the number of false alarms. Another reason is that the output report identifies the exact attribute values that are a result of the failure and may identify the shift in number of users corresponding to each value. Thus, no special drill down is necessary. Hence, it is easier to communicate to other internal teams/partners and pin point the root cause.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
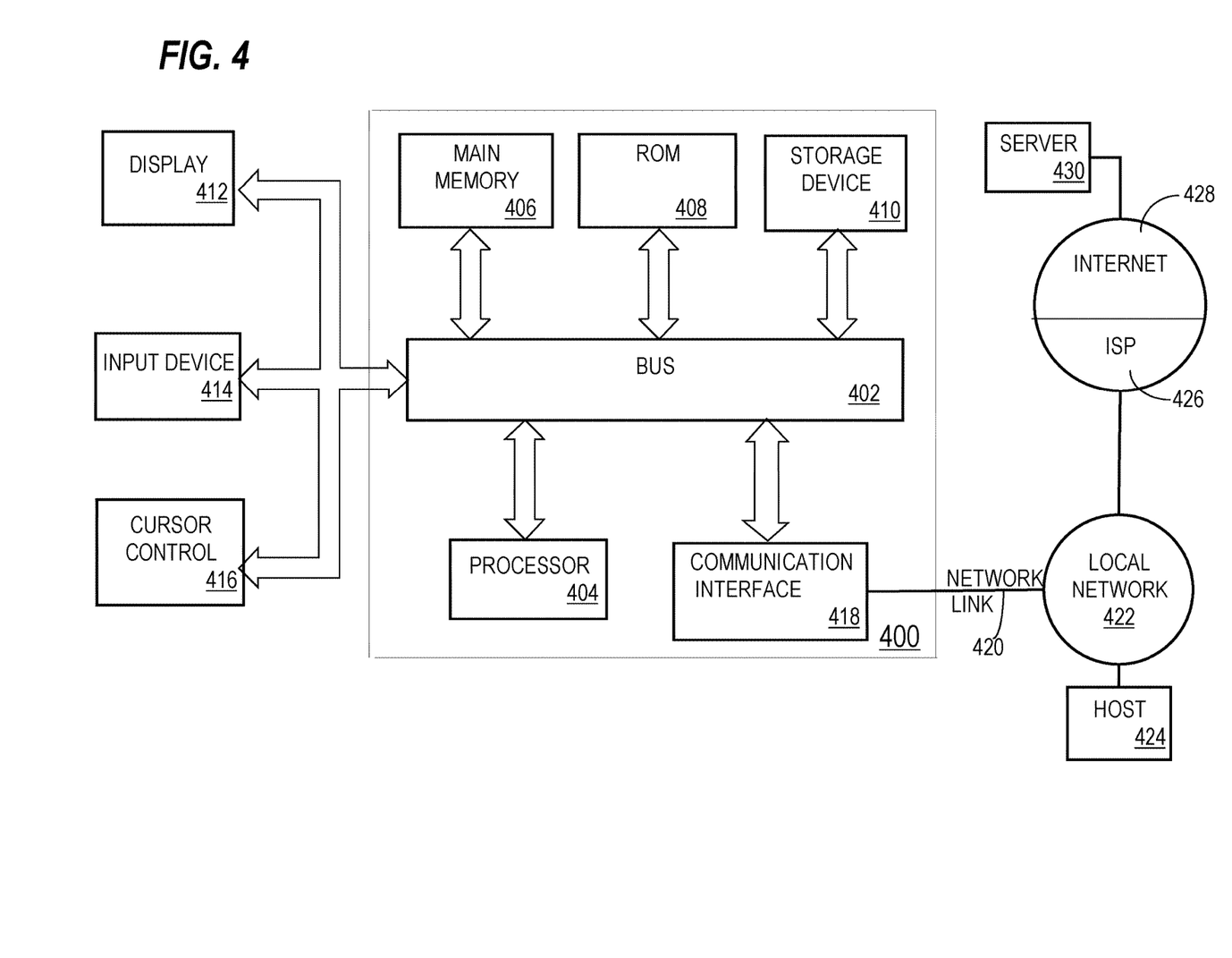
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing first data set that comprises a first plurality of attribute values of a particular attribute, wherein each attribute value in the first plurality of attribute values is associated with a different user of a first plurality of users;
   storing second data set that comprises a second plurality of attribute values of the particular attribute, wherein each attribute value in the second plurality of attribute values is associated with a different user of a second plurality of users;
   for each attribute value of the first plurality of attribute values:
      determining a first number of instances of said each attribute value in the first data set;
      determining a second number of instances of said each attribute value in the second data set;
      based on a difference between the first number and the second number, determining whether to generate a notification indicating the particular attribute;
   wherein the method is performed by one or more computing devices.

2. The method of claim 1, wherein:
   determining whether to generate the notification comprises determining a level of churn for the particular attribute;
   the method further comprising generating the notification if the level of churn is above a particular threshold.

3. The method of claim 2, wherein the level of churn for the particular attribute is based on a number of attribute values that appear in the second data set but not in the first data set, a number of attribute values that appear in the first data set but not in the second data set, or a number of attribute values that changed a certain amount.

4. The method of claim 3, wherein the level of churn for the particular attribute is based on two or more of the number of attribute values that appear in the second data set but not in the first data set, the number of attribute values that appear in the first data set but not in the second data set, or the number of attribute values that changed the certain amount.

5. The method of claim 2, further comprising:
generating a normal probability model based on historical percent churn values associated with the particular attribute;
establishing the particular threshold based on the normal probability model.

6. The method of claim 2, further comprising:
training a classifier based on training data comprising historical percent churn values associated with the particular attribute and label data;
establishing the particular threshold using the classifier.

7. The method of claim 2, wherein:
the first data set includes attribute values of a plurality of attributes that includes the particular attribute and a second attribute that is different than the particular attribute;
the first data set comprises a third plurality of attribute values of the second attribute;
the second data set comprises a fourth plurality of attribute values of the second attribute;
the method further comprising:
for each attribute value of the third plurality of attribute values:
determining a third number of instances of said each attribute value in the first data set;
determining a fourth number of instances of said each attribute value in the second data set;
based on the third number and the fourth number, determining whether to generate a second notification indicating the second attribute.

8. The method of claim 7, wherein:
determining whether to generate the second notification comprises determining a second level of churn for the second attribute;
the method further comprising generating the second notification if the second level of churn is above a second threshold that is different than the particular threshold.

9. The method of claim 1, further comprising, for a particular attribute value of the first plurality of attribute values:
determining a difference between (1) a first particular number of instances of the particular attribute value in the first data set and (2) a second particular number of instances of the particular attribute value in the second data set;
determining whether a value that is based on the difference is above a particular threshold;
in response to determining that the value is above the particular threshold, storing data that indicates that the particular attribute value is associated with a value that is above the particular threshold;
causing the particular attribute value to be presented on a computing device.

10. The method of claim 1, further comprising, prior to determining the second number of instances of said each attribute value:
receiving, over a network, a plurality of updates from a plurality of users;
based on the plurality of updates, updating a plurality of profiles associated with the plurality of user;
wherein the second data set reflects the plurality of updates and the first data set does not reflect the plurality of updates.

11. The method of claim 1, further comprising, prior to determining the second number of instances of said each attribute value:
performing an analysis of online user activity;
based on the analysis, updating a plurality of profiles associated with the plurality of users;
wherein the second data set reflects the updating and the first data set does not reflect the updating.

12. The method of claim 1, wherein the particular attribute is one of age, gender, job title, job industry, geographic location, current employer, academic degree earned, spoken language, or a particular type of online activity.

13. The method of claim 11, wherein the particular attribute is the particular type of online activity, wherein the particular type of online activity is one of a number of companies followed online, a number of online jobs postings visited, a number of jobs applied to, a number of online comments submitted, a number of online postings, a number of likes of online articles, or a number of content items clicked on.

14. The method of claim 1, wherein the first plurality of users is different than the second plurality of users.

15. One or more storage media storing instructions which, when executed by one or more processors, cause:
storing first data set that comprises a first plurality of attribute values of a particular attribute, wherein each attribute value in the first plurality of attribute values is associated with a different user of a first plurality of users;
storing second data set that comprises a second plurality of attribute values of the particular attribute, wherein each attribute value in the second plurality of attribute values is associated with a different user of a second plurality of users;
for each attribute value of the first plurality of attribute values:
determining a first number of instances of said each attribute value in the first data set;
determining a second number of instances of said each attribute value in the second data set;
based on a difference between the first number and the second number, determining whether to generate a notification indicating the particular attribute.

16. The one or more storage media of claim 15, wherein:
determining whether to generate the notification comprises determining a level of churn for the particular attribute;
the instructions, when executed by the one or more processors, further cause generating the notification if the level of churn is above a particular threshold.

17. The one or more storage media of claim 16, wherein the level of churn for the particular attribute is based on a number of attribute values that appear in the second data set but not in the first data set, a number of attribute values that appear in the first data set but not in the second data set, or a number of attribute values that changed a certain amount.

18. The one or more storage media of claim 16, wherein:

the first data set includes attribute values of a plurality of attributes that includes the particular attribute and a second attribute that is different than the particular attribute;

the first data set comprises a third plurality of attribute values of the second attribute;

the second data set comprises a fourth plurality of attribute values of the second attribute;

the instructions, when executed by the one or more processors, further cause:

for each attribute value of the third plurality of attribute values:

determining a third number of instances of said each attribute value in the first data set;

determining a fourth number of instances of said each attribute value in the second data set;

based on the third number and the fourth number, determining whether to generate a second notification indicating the second attribute;

determining whether to generate the second notification comprises determining a second level of churn for the second attribute;

the instructions, when executed by the one or more processors, further cause generating the second notification if the second level of churn is above a second threshold that is different than the particular threshold.

19. The one or more storage media of claim 15, wherein the instructions, when executed by the one or more processors, further cause, prior to determining the second number of instances of said each attribute value:

receiving, over a network, a plurality of updates from a plurality of users;

based on the plurality of updates, updating a plurality of profiles associated with the plurality of users;

wherein the second data set reflects the plurality of updates and the first data set does not reflect the plurality of updates.

20. The one or more storage media of claim 15, wherein the first plurality of users is different than the second plurality of users.

* * * * *